United States Patent [19]

Munson

[11] E Re. 29,911

[45] Reissued Feb. 13, 1979

[54] MICROSTRIP ANTENNA STRUCTURES AND ARRAYS

[75] Inventor: Robert E. Munson, Boulder, Colo.

[73] Assignee: Ball Corporation, Muncie, Ind.

[21] Appl. No.: 852,730

[22] Filed: Nov. 18, 1977

Related U.S. Patent Documents

Reissue of:

[64] Patent No.: 3,921,177
Issued: Nov. 18, 1975
Appl. No.: 352,005
Filed: Apr. 17, 1973

[51] Int. Cl.[2] ..... H01Q 1/38; H01Q 3/26

[52] U.S. Cl. ..... 343/700 MS; 343/854

[58] Field of Search ..... 343/700 MS , 767, 846, 343/854

[56] References Cited

U.S. PATENT DOCUMENTS

| | | | |
|---|---|---|---|
| Re. 29,296 | 7/1977 | Krutsinger et al. | 343/700 MS |
| 2,874,276 | 2/1959 | Dukes et al. | 343/846 |
| 3,400,405 | 9/1968 | Patterson | 343/854 |
| 3,478,362 | 11/1969 | Ricardi et al. | 343/769 |
| 3,665,480 | 5/1972 | Fassett | 343/769 |
| 3,680,136 | 7/1972 | Collings | 343/769 |
| 3,753,162 | 8/1973 | Charlton et al. | 333/31 R |
| 3,778,717 | 12/1973 | Okoshi et al. | 343/700 MS |
| 3,803,623 | 4/1974 | Charlot | 343/700 MS |

FOREIGN PATENT DOCUMENTS

| | | | |
|---|---|---|---|
| 1050583 | 1/1954 | France | 343/700 MS |

*Primary Examiner*—Eli Lieberman
*Attorney, Agent, or Firm*—J. David Haynes

[57] ABSTRACT

A microstrip antenna structure formed from a unitary conducting surface separated from a ground plane by a dielectric film where the r.f. radiator and feedlines form a generally planar arrangement of unitary integrally formed electrical conductors. The r.f. radiators are fed from an outside edge to selectively produce linearly and/or circularly polarized radiation at a selected resonant frequency(s). Necessary fixed phase shifting circuits are integrally formed by printed circuit techniques in the generally planar arrangement of electrical conductors foı the circularly polarized radiators. A plurality of such antenna elements are also formed into a phased antenna array to achieve substantially ideal array gain thus producing an extremely high gain antenna with inexpensive printed circuit board construction techniques. Furthermore, appropriately controlled phase shifting networks may be integrally formed within the generally planar array of electrical conductors in combination with switchable diode elements to achieve any desired relative phase shifts between the array elements and thus to steer the array beam in a desired direction.

19 Claims, 10 Drawing Figures

Fig. 4
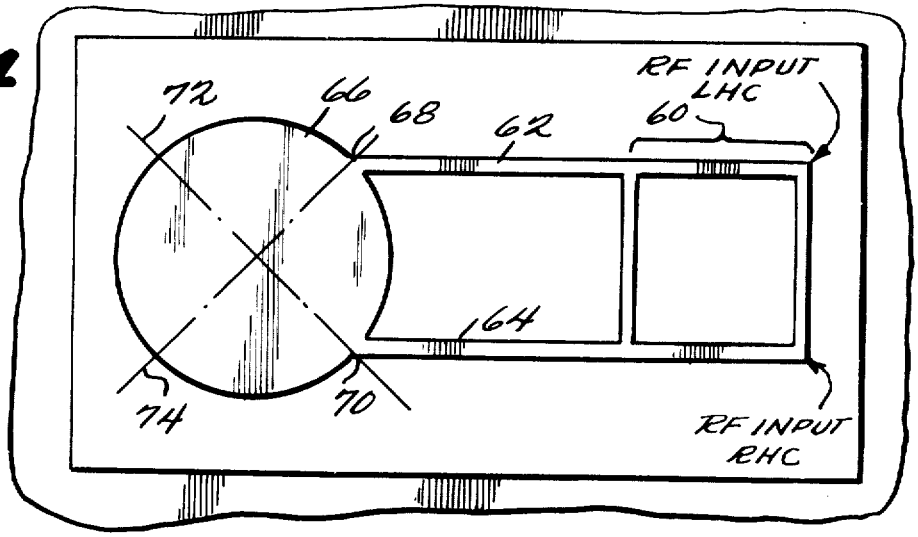
Fig. 5
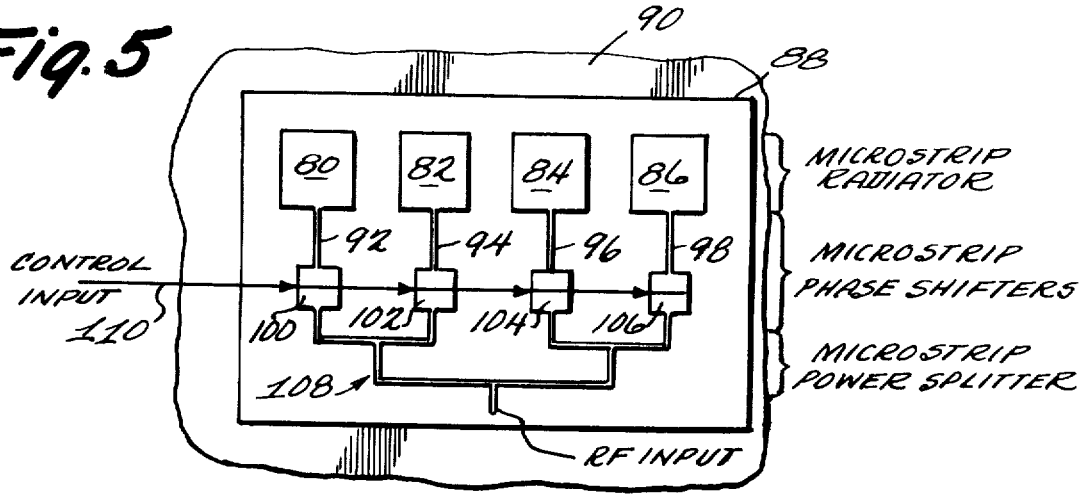
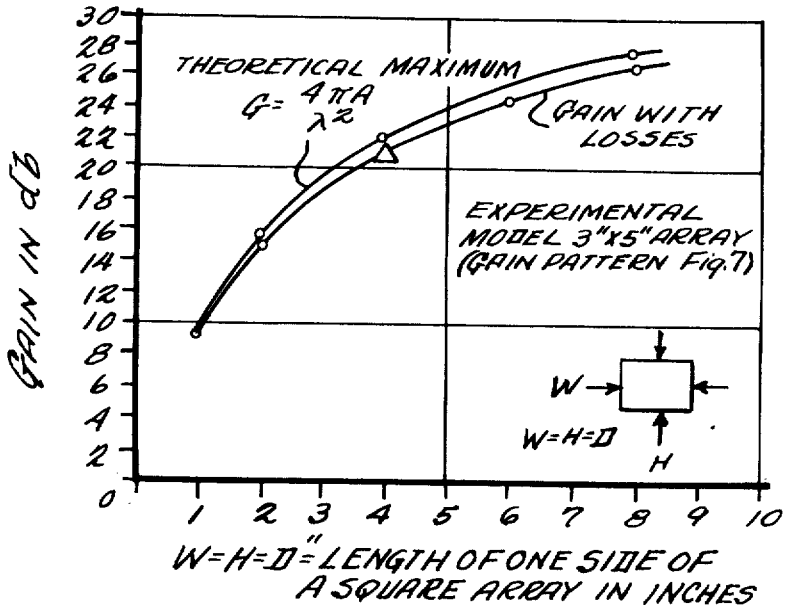
Fig. 6

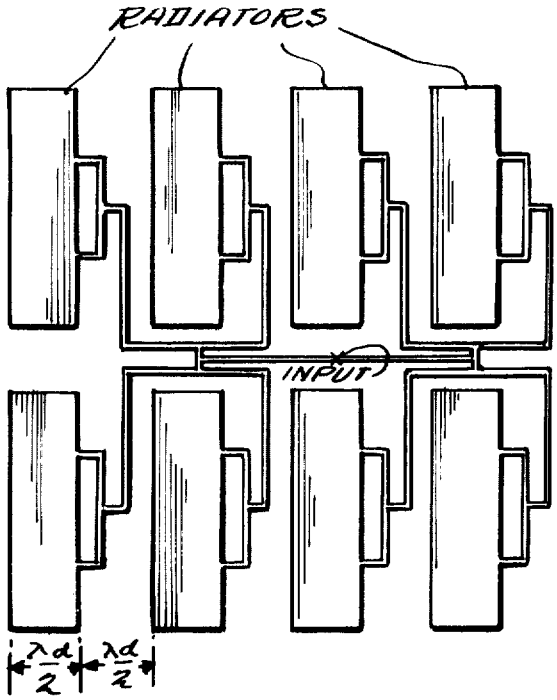
Fig. 8
Fig. 9
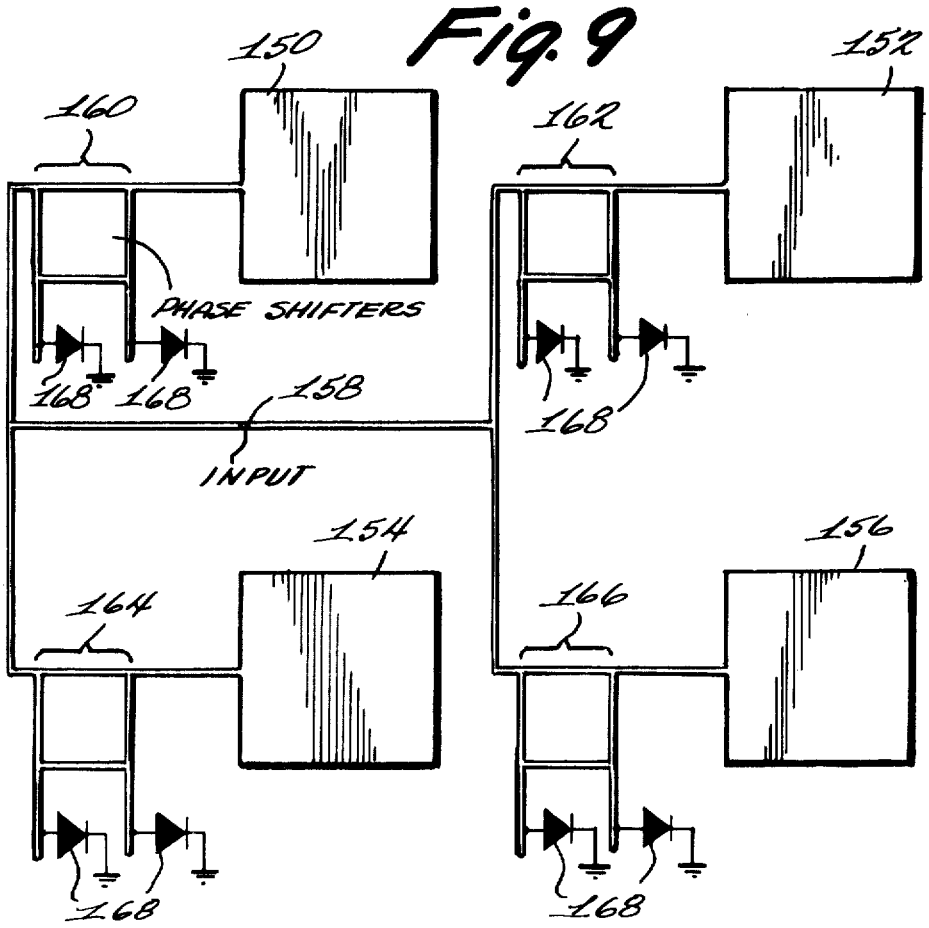

MICROSTRIP ANTENNA STRUCTURES AND ARRAYS

Matter enclosed in heavy brackets [ ] appears in the original patent but forms no part of this reissue specification; matter printed in italics indicates the additions made by reissue.

The subject matter disclosed herein is related to my co-pending commonly assigned application Ser. No. 352,034, now U.S. Pat. No. 3,811,128 filed concurrently herewith. It is also related to earlier commonly assigned U.S. Pat. No. 3,713,162 issued Jan. 23, 1973 and to the commonly assigned co-pending patent application Ser. No. 99,481 filed Dec. 18, 1970, now U.S. Pat. No. 3,810,183.

This invention generally relates to microstrip antenna structures and to phased arrays formed from a plurality of such structures.

In designing antenna structures it is attempted to make such antennas perform a desired electrical function such as transmitting/receiving linearly polarized, right-hand circularly polarized, left-hand circuitry polarized, etc., r.f. signals with appropriate gain, bandwidth, etc., electrical characteristics. Yet it is also necessary for these structures to remain mechanically light, simple, cheap and unobtrusive since such antennas are often required to be mounted upon other structures such as high velocity aircraft, missiles, and rockets which cannot tolerate excessive deviations from aerodynamic shapes. Of course, it is also sometimes desirable to hide the antenna structures so that its presence is not readily apparent for aesthetic and/or security reasons. Accordingly, the ideal electrical antenna should physically be paper thin and protrude on neither side of a mounting surface (such as an aircraft skin or the like) while yet still exhibiting all the requisite electrical features.

A microstrip printed circuit board antenna formed by etching a single side of a unitary metallically clad dielectric sheet or film using conventional photo resist-etching techniques potentially presents the closest approximation to these ideal requirements. Typically, the entire antenna structure may possibly be only 1/32 inch to ⅛ inch thick while minimizing cost and maximizing manufacturing/operating reliability and reproducibility. Furthermore, the cost to the customer is minimized since single antenna elements and/or arrays of such elements together with appropriate r.f. feedlines, phase shifting circuits and/or impedance matching networks may all be manufactured as integrally formed electrical circuits along using low cost photo resist-etching processes commonly used to make electronic printed circuit boards. This is to be compared with many complicated costly prior art techniques for achieving polarized radiation patterns as, for instance, a turnstile dipole array, the cavity backed turnstile slot array, etc.

While the above referenced related application Ser. No. 99,481 and/or U.S. Pat. No. 3,713,162 disclose some elongated forms of microstrip antenna radiators, it has now been discovered that other microstrip antenna radiator structures are advantageously suited to transmit/receive r.f. radiation having predetermined polarizations such as linear polarization and left-hand or right-hand circular polarization.

Furthermore, these newly discovered microstrip antenna structures have been discovered to be especially well suited for use in an overall array comprising a plurality of such individual elements where the individual elements are phased relative to one another to provide high gain fan beam or pencil beam radiation patterns when disposed in a flat or even curved array of such microstrip antenna structures.

It has been discovered that the necessary relative phase shifts for such arrays can be economically achieved with phase shifting circuitry that is integrally formed by printed circuit board techniques wherein the r.f. feedline, impedance matching, etc., circuits are included within a generally planar arrangement of electrical conductors comprising both r.f. radiators, r.f. feedlines, etc. Of course, it will be appreciated throughout the following discussion that the phrase "generally planar arrangement" is to include the case where the integrally formed microstrip is distorted from a purely planar structure to take on curved shapes and the like. In such cases, the "generally planar arrangement" would still constitute a single "layer" integral structure conforming to some predetermined shape and is thus to be considered as included in the following description (i.e. conformed array).

The fan or pencil beam of radiation may also be controllably steered by controlling switchable diodes or other controlled elements mounted directly on the microstrip structure in combination with appropriate integrally formed phase shifting circuits, etc., as will be explained in more detail below.

Since the microstrip antenna structures described herein require only one printed circuit board for an entire antenna radiator, associated feedlines, impedance matching networks and phase-shifting networks which printed circuit board is photo-etched on only one side, there is no requirement for front to back registration of plural photo-etched patterns nor are board alignments required as when two or more separate printed circuit boards are utilized.

It has been discovered that linearly polarized radiation may be produced by simply feeding one point along one side of a square shaped or rectangularly shaped microstrip radiator. The approximate resonant frequency of this type of linearly polarized radiator is determined by the radiator dimension perpendicular to the side on which the r.f. energy is input. Accordingly, in the case of the square radiator, the resonant frequency is determined by the length of any one of the sides while in the rectangular radiator the resonant frequency may be one of two frequencies. Namely, a first frequency determined by the shorter dimension when r.f. energy is fed into the longer dimensioned side and, correspondingly, a second frequency determined by the longer dimension when r.f. enenrgy is fed into the shorter side of the rectangular radiator.

The relevant dimension in both cases is substantially equal to one-half wavelength of the anticipated operating or resonant frequency when proper account is taken of the dielectric constant for the dielectric material utilized in the microstrip structure. That is, the relevant dimension should be approximately equal to the relevant free space wavelength divided by two times the square root of the relative permittivity for the dielectric material.

The necessary r.f. feedlines are preferably also formed using integrated circuit or photo etching techniques to be included as a part of the generally planar arrangement of electrical conductors comprising r.f. feedline and r.f. radiators. Furthermore, the dimensions of the r.f. feedline should be designed according to conventional impedance matching techniques to match the antenna impedance to the impedance of the anticipated coaxial cable or other r.f. conduit connected to the r.f. feedlines on the microstrip structure.

Circularly polarized radiation fields may be transmitted by driving adjacent sides of a square microstrip radiator with signals having relative phasing of 90° to produce the required conjugate phasing of the radiated fields. Either left-hand or right-hand circularly polarized signals may be produced.

Circular polarization may also be achieved by driving the corner of a square microstrip patch radiator. Furthermore, the microstrip radiator does not need to be an exact square since it has also been discovered that other shapes (for instance, a circularly shaped microstrip radiator driven at points separated by 90° about its circumferential edge with signals having 90° relative phase angles) will also produce the desired circularly polarized radiation.

The necessary r.f. feedlines, phase shifters and/or impedance matching networks are also preferably integrally formed by the same printed circuit board etching techniques with the microstrip radiator(s) thus minimizing the cost and complexity of the overall device.

It has been discovered that such microstrip radiators perform exceptionally well known a plurality of radiators are utilized in a linear or two-dimensional array to achieve a high gain fan or pencil beam radiation pattern. Such arrays exceed the performance of conventional arrays and very nearly approach the maximum theoretical gain limits for such an array. In part, it is believed that this unexpected and exceptional performance of microstrip antenna arrays is due to the greatly increased uniformity of large area sheet currents generated thereby.

It has further been discovered that such arrays of microstrip radiators may be electronically steered using controllable phase shift circuits that are also integrally formed with the r.f. feedlines, impedance matching networks and microstrip radiators. In one exemplary embodiment to be described in more detail below, switchable diodes are connected into such printed circuit phase shifters using conventional printed circuit board techniques whereby such switchable diodes may be controlled by an appropriately programmed minicomputer or other conventional control means to achieve required relative phase shifts between the driving currents supplied to the various elements of the microstrip antenna array thus steering the fan and/or pencil beam to any desired position as will be appreciated.

It is also possible to utilize the normal microstrip feedline losses in such an integral array of microstrip radiators to achieve an amplitude taper across the array aperture thus reducing undesired sidelobes.

These and other advantages and objects of the invention will be more fully appreciated by reading the following detailed description of the invention in conjunction with the accompanying drawings, of which:

FIG. 4 is a plan view of another embodiment of a circularly polarized microstrip antenna element according to this invention;

FIG. 5 is a plan view of schematic diagram of an exemplary linear array of microstrip antenna elements according to this invention;

FIG. 6 is a graph of theoretical maximum and experimentally measured gains for arrays of microstrip antenna elements constructed according to this invention;

FIG. 8 is a schematic plan view of a two-dimensional microstrip antenna array according to this invention;

FIG. 9 is a schematic diagram of an electrically scanable phased array of microstrip antenna elements constructed according to this invention.

Figure 1:
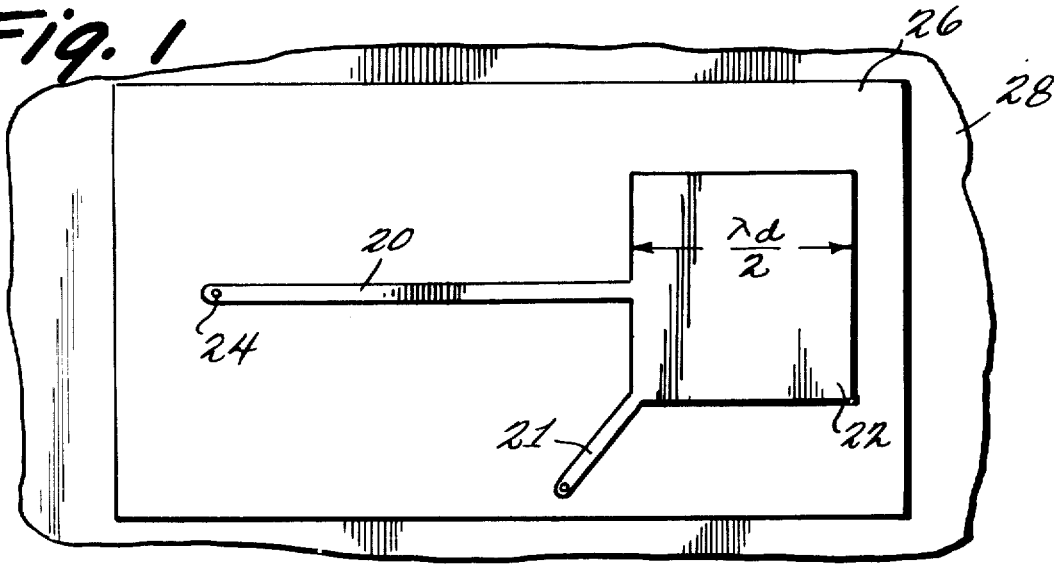
FIG. 1 is a plan view of an exemplary embodiment of a linearly and/or circularly polarized microstrip antenna element according to this invention.

FIG. 1 shows a plan view of one exemplary embodiment of linearly polarized microstrip antenna element according to this invention. A uniformly dimensioned r.f. feedline 20 is shown in FIG. 1 although those in the art will appreciate that the dimensions of the feeline 20 should be appropriately designed to match the impedance of the antenna or microstrip radiator 22 with the impedance of a coax or other r.f. conduit which will be connected to the input of the r.f. feedline 20 at 24 to provide a source of the r.f. energy or to conduct r.f. energy that may have been received by the antenna element to a receiver as will be appreciated by those in the art. The r.f. feedline 20 and the r.f. radiator 22 are formed from a unitary sheet of conductive material that has been selectively etched away using conventional prined circuit board construction techniques from a substrate of dielectric material 26. The bottom side of the substrate 26 is then positioned over a conducting ground plane surface 28 which may, in fact, be a copper (or other conductor) surface clad onto the bottom side of the dielectric substrate 26. Alternatively, the microstrip structure on dielectric substrate 26 may be conformed to the electrically conducting skin of a vehicle or other conducting ground plane 28 as will be appreciated.

The square microstrip radiator 22 should be dimensioned such that its sides are equal to approximately one-half wavelength ($\lambda_d/2$) at the anticipated operating frequency when proper corrections are made for the dielectric constant of the dielectric substrate 26. Namely, when the free space wavelength has been divided by the square root of the relative permittivity of the dielectric substrate 26 as will be appreciated by those in the art.

While it may be first thought that the dimensions should be exactly one-half wavelength, in actuality, the dimensions should preferably be slightly less than one-half wavelength to insure that the radiator input impedance is approximately or substantially all real. That is, to insure that the imaginary part of the slot reactance reflected from the far edge of the radiator substantially cancels out the imaginary part of the reactance from the slot located at the near edge of the radiator. Typically, the square radiator 22 should have sides equal to approximately 0.49 of the free space wavelength divided by the square root of the relative permittivity as should now be apparent. Generally speaking, it has been found that acceptable dimensions may range around 0.47 to 0.49 of the half wavelength $\lambda_d/2$ thus being substantially equal to the half wavelength but still slightly less as should now be apparent. Hereafter, when the dimensions of the radiators are discussed in terms of half wavelengths it will be understood that in reality the relevant dimension should preferably be slightly less than one-half wavelength to insure that the antenna input impedance is substantially resistive.

Figure 2:
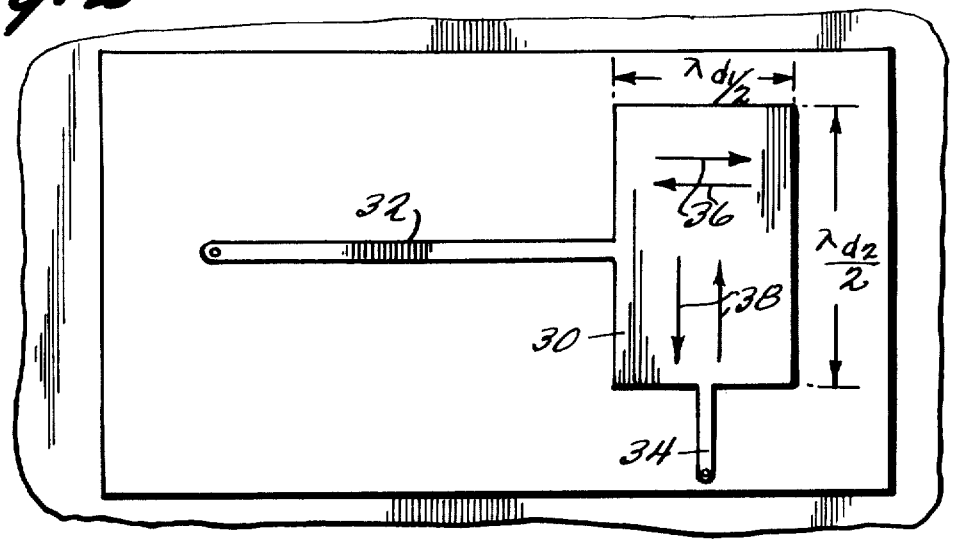
FIG. 2 is a plan view of another exemplary embodiment of a linearly polarized microstrip antenna element according to this invention having two resonant frequencies.

The microstrip radiator does not have to be square to produce linearly polarized radiation. For instance, as shown in FIG. 2, a rectangular microstrip radiator 30 may be fed either from r.f. feedline 32 attached to the longer dimension $\lambda_{d2}/2$ of the rectangular area or from an r.f. feedline 34 attached to the shorter dimension $\lambda_{d1}/2$ of the rectangular area. It has been discovered that the electrical r.f. sheet currents passing along the surface of the microstrip radiator 30 will be substantially parallel to the corresponding r.f. feedline as shown by arrows 36, 38 in FIG. 2. Although the r.f. feedlines are preferably located in the center of the respectively corresponding sides to achieve maximum uniformity of sheet current distribution, it is also considered feasible to connect the r.f. feedlines at other points along the same side of the radiator without seriously affecting the linear polarization characteristics of the element.

In the example shown in FIG. 2, the resonant frequency of the radiator 30 will be determined by the shorter dimension when it is fed from the r.f. feedline 32 and it will be determined by the longer dimension when it is fed by the r.f. feedline 34. Thus, the same radiator may be used to operate at two different selected frequencies. As indicated in FIG. 2, the same considerations apply with respect to choosing the dimensions of the rectangular radiator area 30 as with the radiator area 22 shown in FIG. 1. Namely: the shorter dimension is approximately one-half wavelength of the desired resonant frequency when r.f. feedline 32 is used while the longer dimension is approximately one-half wavelength of the desired resonant frequency when the r.f. feedline 34 is utilized.

The square radiator 22 of FIG. 1 may also be used as a circularly polarized radiator when fed from a corner as shown at 21 in FIG. 1. Here, as shown in FIG. 1, the left-to-right dimension of the square 22 should be slightly less than one-half wavelength while the top-to-bottom dimension should be slightly greater than one-half wavelength as necessary to obtain two orthogonal admittances such as 0.01 + j.01 and 0.01 − j.0.1 across the square path 22. Then, when fed at the corner from feedline 21, the radiated fields will have conjugate phases or, in other words, the total radiated field will be circularly polarized. Left or right-hand circular polarization can be achieved by choosing the r.f. input/output corner. As just described and shown in FIG. 1, right-hand circular polarization would result while left-hand circular polarization would result if feedline 21 were moved to one of the adjacent corners of square 22.

Figure 3:
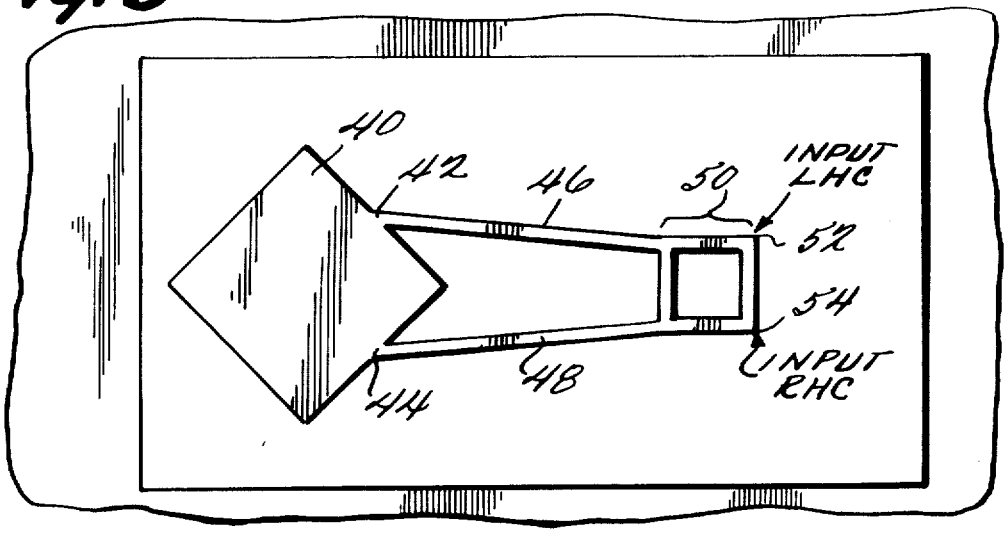
FIG. 3 is a plan view of an exemplary embodiment of a circularly polarized microstrip antenna element according to this invention.

The square shaped r.f. radiator 40 shown in FIG. 3 also constitutes a circularly polarized microstrip antenna element when driven on the two adjacent sides 42 and 44 by r.f. currents having relative phase differences of 90°. As shown in FIG. 3, side 42 is fed from r.f. feedline 46 while side 44 is fed from the r.f. feedline 48 where both feedlines emanate from the integrally formed printed circuit phase-shifting arrangement 50 having an r.f. input/output 52 corresponding to left-hand circular polarization and r.f. input/output 54 corresponding to right-hand circular polarization. When input 52 is utilized, the r.f. signals propagating to and along the r.f. feedline section 48 are 90° out of phase with similar r.f. signals propagated to and along the r.f. feedline section 46. The same consideration apply when the input is at 54 except that the roles of the two r.f. signals are reversed and the one that was leading by 90° is now lagging by 90°.

Assume for the moment that the r.f. signals presented to side 44 of the radiator 40 are represented by cos wt and that those signals being input to side 42 are represented by cos $(wt-\pi/2)$. In this case, at t=o, the electric sheet current on the radiator 40 would be directed substantially away from side 44 and parallel to side 42. Later, when $wt=\pi/2$, the radiating electrical sheet currents would effectively have been rotated by 90° to pass parallel to side 44 and away from side 42. Still later, when $wt=\pi$, the electric sheet currents would be effectively shifted by another 90° to be generally parallel to side 42 and directed towards side 44. Finally, when $wt=3\pi/2$, the electric sheet current would be further rotated by another 90° generally parallel to side 44 and directed towards side 42. Accordingly, it will now be appreciated that the radiator 40 will generate circularly polarized radiation, the effective direction of circular polarization being determined by side 42 or 44 being fed by currents leading or lagging respectively by 90°.

FIG. 4 shows another form of circularly polarized microstrip antenna element according to this invention wherein the radiator 66 is not square or diamond shaped as was the case in FIG. 3. A square shaped phase shifting circuit 60 similar to the phase shifting circuit 50 previously described in FIG. 3 is here utilized together with r.f. feedline sections 62 and 64 conducting r.f. having relative phase angles of $\pi/2$ to the feed points 68 and 70, which feed points are located at a 90° interval about the circumference of the circular radiating element 66. As should now be apparent, the same kind of left-hand and right-hand circularly polarized radiation patterns may be obtained using this arrangement.

It may be noted in FIG. 4 that the radiator 66 is symmetric with respect to each of two mutually perpendicular axes 72 and 74 intersecting at the center of the circular area 66 also generally passing through the feed points 68 and 70 located at 90° apart about the circumference of the circular radiating element 66. A similar observation could also have been made for the feed point(s) of the square or rectangular radiating areas already discussed wherein the two mutually perpendicular axes would have been parallel to the sides of the squares or rectangular area as should now be apparent.

As those in the art will appreciate, circular polarization is only a special case of elliptical polarization and in actual practice, truly exact circular polarization is usually obtained if at all only in a portion of an antenna radiation pattern with the remainder of the pattern actually comprising elliptical polarizaton of an approximation of the desired circular polarization radiation. It will be understood that the term circular polarization is used here in that same conventional sense.

The microstrip antenna structures previously described also make exceptionally good performing arrays when a plurality of such individual antennas are formed into a phased antenna array to generate fan or pencil beam radiation patterns. One exemplary embodiment of a steerable array of such radiators is depicted in FIG. 5. It should be understood that the entire array may be formed as an integral printed circuit together with any required phase shifting circuits, etc., to provide an extremely simple and cheap phased array having exceptional qualities.

The exemplary four element linear array is shown in FIG. 5 comprises microstrip r.f. radiators 80, 82, 84 and 86 on dielectric sheet 88 over ground plane 90. Each of these r.f. radiators is fed by respectively associated r.f. feedline segments 92, 94, 96 and 98 which receive the output of respectively associated controllable phase shifters 100, 102, 104 and 106. Although these phase shifters receive equal power and equal phase r.f. inputs from the symmetric corporate structure r.f. feedline generally indicated by reference numeral 108, the outputs on r.f. feedline segments 92–98 have controlled relative phase differences as a function of the control input on line 110 to result in a controllably steerable fan beam of radiation. As will be appreciated, similar controlled phase shifts could be incorporated in a two dimensional array to achieve a steerable pencil beam radiation pattern.

The exceptional performance of these microstrip antenna arrays is believed to be caused by the exceptionally uniform illumination of the array aperture. The close approximation of expected and experimentally measured antenna gain for such an array versus the theoretical maximum gain is shown in FIG. 6 and it can be seen that the expected/experimental results very nearly approaches the theoretical maximum.

Apparently the only reason the theoretical maximum is not obtained is that, in practice, the microstrip feedline subtracts from this gain as a function of the frequency and relevant transmission line lengths. More particularly, the theoretical maximum gain G for an absolutely uniformly illuminated aperture is:

$$G = 4\pi A/\lambda 2$$

However, in actual practice, the microstrip feedline attenuation subtracts from this gain $$G_{Actual} = 10 \text{ Log } (4\pi A/\lambda 2) - \alpha$$

Where $$\alpha_{Line} = \alpha/\text{inch} \times L''$$

Thus, the attenuation is dependent on frequency and line length. In the X-band, for a 1/32-inch microstrip line, $\alpha$ equals about 0.12 dB/in. Since for an equal power, equal phase feedline network the length of microstrip feedline is half of the height plus half of the width, therefor for such an arrangement $$\alpha = \tfrac{1}{2}\, \alpha/\text{inch } (W'' + H'')$$

Thus, in the X-band for a 5 inches × 3 inches antenna, $\alpha = 0.48$ dB and it should now be apparent how such losses will affect any given array structure. An experimental model 3 inches × 5 inches × 1/32 inches has been built and tested and confirms a gain (FIG. 7) in excess of the theoretical predictions as shown in FIG. 6. The error is within a $\pm\frac{1}{2}$ dB expected error in the antenna gain measurement.

The controlled microstrip phase shifters 100–106 as shown in FIG. 5 may, for instance, comprise conventional PIN diode(s) and printed circuit phase shifting circuits where the PIN diodes are controlled by a mini-computer or other appropriate control source to achieve a desired relative phase difference between the r.f. energies being fed to the several array elements as should now be apparent.

Figure 7:
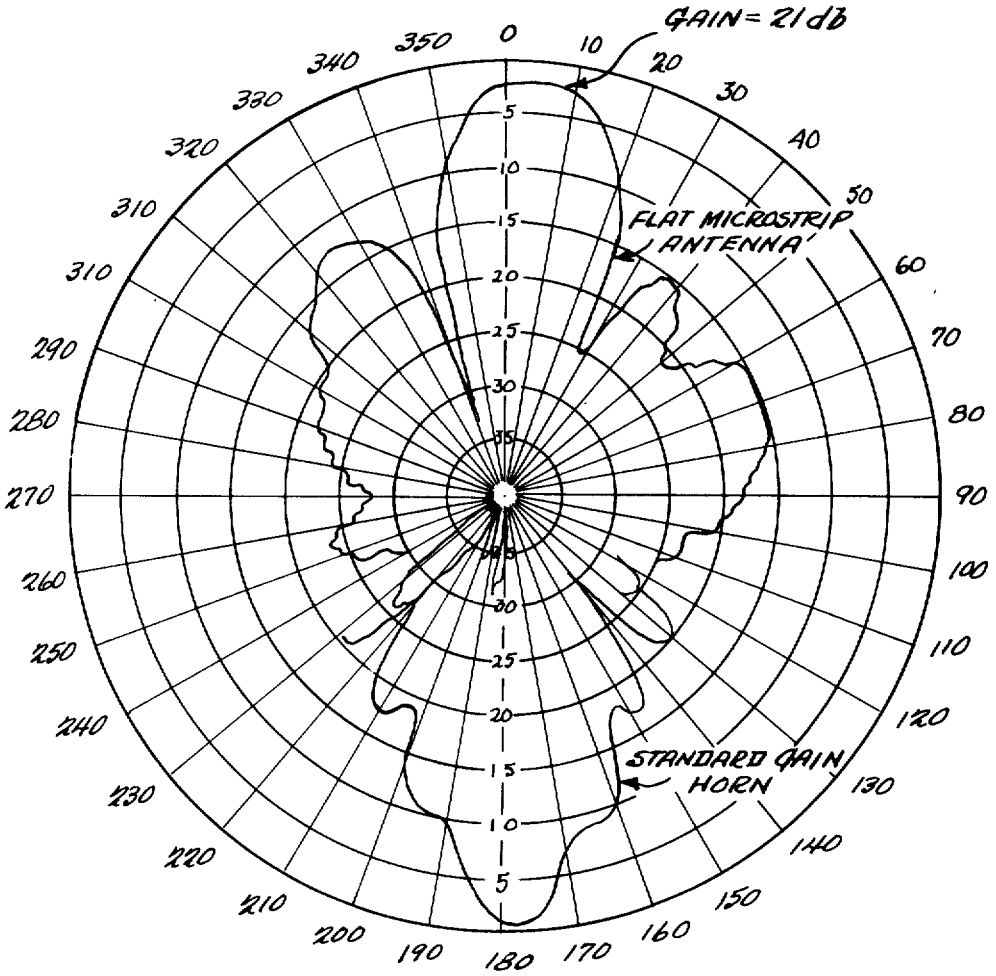
FIG. 7 is a polar plot of the gain pattern for a flat microstrip antenna array constructed according to this invention superimposed upon a reference gain pattern for a standard gain horn antenna.

FIG. 7 reveals that experimentally measured plot of antenna gain for a 3 inches × 5 inches × 1/32 inches flat microstrip array at 9.92 GHz shows a gain of approximately 21 dB for the maximum center lobe which compares favorably with the superimposed (but rotated by 180°) gain pattern of a standard gain horn.

Another array of microstrip radiators is shown in FIG. 8 wherein each of the microstrip radiators is as disclosed in the earlier referenced related patent and/or application and has a plurality of feed points fed from a corporate feed network designed to provide equal phase power r.f. currents to all feed points of all of the radiators. Preferably, the widths of the rectangularly shaped radiators in such an array are equal to approximately one-half wavelength at a desired operating frequency and they are also spaced by approximately one-half wavelength. Of course, the one-half wavelengths here discussed are considered to have been corrected for the relative dielectric constant of the dielectric sheet involved in the microstrip array and to include appropriate allowances for making the actual dimensions slightly less than one-half of such a wavelength to insure substantially resistive input impedances for the several radiators involved.

While the individual microstrip radiators as shown in FIG. 8 are similar to the elongated microstrip radiators previously disclosed in the earlier referenced related copending applications and/or patents having feed points at least once each wavelength along the length thereof it has now been discovered that an array of these elements as shown in FIG. 8 provides an unexpectedly high gain very nearly equal to the maximum possible theoretical gain for an aperture which is believed due to the extremely uniform sheet currents produced by such an array. Of course, the array shown in FIG. 8 could be made steerable by appropriately controlling the relative phases of the driving signals to each of the radiator elements. The array of FIG. 8 thus provides an extremely efficient antenna with a very high gain approaching 100% of the theoretical maximum aperture efficiency. It is very reliable and rugged while at the same time being of minimum thickness and cost to provide a virtually ideal antenna array structure.

Another electrically scanned phased array of microstrip antenna elements is shown in FIG. 9. Here the exemplary array of four radiators 150, 152, 154 and 156 are fed from a corporate network structure having an input at 158 to provide equal power and equal phase r.f. inputs to the four printed circuit microwave phase shifters 160, 162, 164 and 166. As will be appreciated, the relative phase of the output from these phase shifters (and hence the input to the various radiators of the array) will depend upon the location of the switchable diodes 168 in each of the various phase shifters and the on-off condition of these diodes. That is, for example, the diodes may be turned "on" or "off" by supplying a control current and/or connection generated by an appropriately programmed mini-computer or other conventional control means thus controllably changing the relative phase delay of each hybrid phase shifter 160–166 between 0° and 180. Accordingly, by properly controlling the diodes 168, the microstrip radiators may be excited in any desired combination required to produce radiation patterns in any desired direction. Of course, the number of diodes 168 may be increased to refine the possible relative phase shifts that may be achieved with such phase shifters 160–166 as should be appreciated. Furthermore, the number of radiating elements can be increased from the four shown in the exemplary embodiment of FIG. 9 to further reduce the bandwidth and increase the gain of the overall array.

Figure 10:
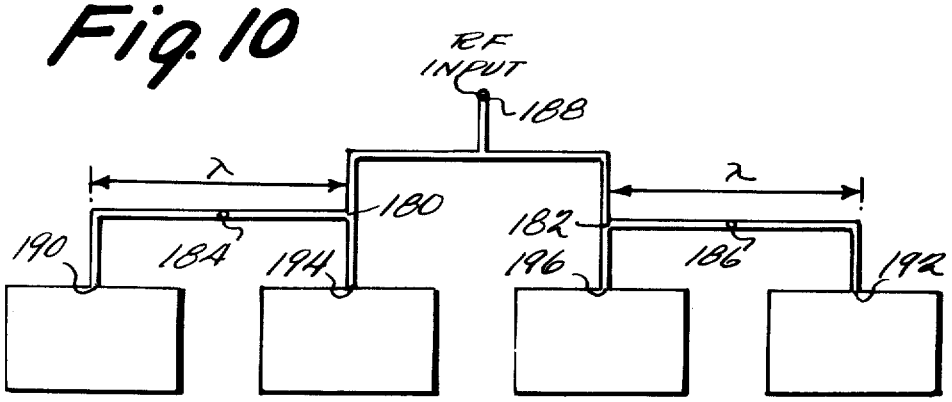
FIG. 10 is a schematic diagram of an array embodiment for achieving amplitude taper across the array aperture and hence reduced sidelobes.

Undesirable array radiation pattern sidelobes may be reduced by using an r.f. feedline arrangement as shown in FIG. 10. As heretofore, explained, the array elements have been excited with equal power r.f. signals by a symmetrical corporate r.f. feedline network as shown, for instance, in FIGS. 5, 8 and 9. The relative phases have also been nominally equal except for the effects of phase shifting circuits previously described.

However, in FIG. 10, the expected losses in the feedline network have been utilized to vary the r.f. power levels supplied to the various radiators. That is, the amplitude distribution has been tapered to reduce undesirable sidelobes in the overall array radiation pattern.

For instance, the feedline junction points 180, 182 have been offset by one-half wavelength from their usual points 184, 186. Thus, the difference in total feedline length from the common input/output 188 to feed points 190, 192 and from input/output point 188 to feed points 194, 196 is one whole wavelength whereas it was previously zero. Thus, the relative phases of the r.f. inputs to the array elements are unaffected. However, the longer feedline lengths to points 190, 192 results in reduced r.f. amplitude relative to the r.f. amplitude at points 194, 196 thus tapering the array aperture's amplitude distribution to reduce undesired sidelobes. Of course, more detailed tapering or amplitude shaping could be achieved by this same technique with an array having larger numbers of elements.

Furthermore, this amplitude tapering can also be used with elongated microstrip radiators as disclosed in the earlier referenced related patent and applications.

While only a few embodiments of this invention have been specifically described and discussed above, those in the art will appreciate that there are many possible modifications and variations of the exemplary embodiments without in any way departing from the spirit and teaching of this invention. Accordingly, all such modifications and/or variations are intended to be included within the scope of this invention.

What is claimed is:

1. An antenna structure comprising:

an electrically conducting ground surface, a single layer electrically conducting surface comprising both an r.f. radiator conducting area and an r.f. feedline conducting area integrally connected thereto, a dielectric sheet disposed between said ground surface and the single layer electrically conducting surface, and said r.f. feedline being connected at the outside edge of said r.f. radiator conducting area to at least one predetermined point on the periphery of said radiator conducting area to achieve an r.f. radiation pattern having predetermined polarization characteristics from said radiator, said r.f. feedline conducting area including:

a first section connected to only a first point on the outside edge of said r.f. radiator conducting area, a second section connected to only a second point on the outside edge of said r.f. radiator conducting area, said first and second points being separated by a predetermined amount along the outside edge of said r.f. conducting area to define two intersecting axes of current flow, each such axis passing through a corresponding one of said first and second points, and phase shifting means connected between said first and second sections and a common r.f. input/output point whereby the relative phases of r.f. signals on said first and second sections are controlled with respect to the phase at said common r.f. input/output to produce an r.f. radiation pattern having circular polarization characteristics.

2. An antenna structure as in claim 1 wherein said phase shifting means comprises means for introducing a 90° relative phase shift thereby producing circular r.f. polarization.

3. An antenna structure as in claim 2 wherein said phase shifting means comprises:

a closed rectilinear conductive path having four corners, said first and second sections being connected to respectively associated adjacent ones of said corners, and said common r.f. input/output comprising one of the remaining two corners for right-hand circular r.f. polarization and comprising the other one of the remaining two corners for left-hand circular r.f. polarization.

4. An antenna structure as in claim 2 wherein:

said r.f. radiator conducting area is a square shaped area.

5. An antenna structure as in claim 2 wherein:

said r.f. radiator conducting area is a circularly shaped area.

6. An antenna array comprising:

an electrically conducting ground surface, a single layer arrangement of electrical conductors comprising both a plurality of r.f. radiators and a corporate structure r.f. feedline having a common input/output connected thereto, a dielectric sheet disposed between said ground surface and the single layer arrangement of electrical conductors, each of said r.f. radiators comprising an elongated unitary conducting area separate from said dielectric sheet, each of said areas having a width substantially equal to one-half wavelength at an anticipated operating frequency and a length of more than one such wavelength with a plurality of spaced feed points along one of the longer sides located at intervals of no more than one such wavelength apart, said plural r.f. radiators being spaced from one another by substantially one-half such wavelength in a direction perpendicular to the longer sides of the r.f. radiators, and said corporate structure r.f. feedline being connected to said spaced feed points at the outer edge of said r.f. radiators.

7. An antenna array as in claim 6 wherein said corporate structure r.f. feedline comprises predetermined different r.f. transmission lengths between the common input/output and the various r.f. radiators to produce a tapered amplitude distribution over the aperture of the array thereby reducing sidelobes in the r.f. radiation pattern of the array.

8. A phased antenna array structure comprising:

an electrically conducting ground surface, a single layer arrangement of electrical conductors comprising a plurality of r.f. radiators and a respectively corresponding plurality of r.f. feedline antenna structures respectively connected thereto and also connected to a common r.f. input/output point, a dielectric sheet disposed between said ground surface and the single layer arrangement of electrical conductors, each of said r.f. feedlines being connected at the outer edge of its correspondingly associated r.f. radiator to at least one predetermined point to achieve an r.f. radiation pattern from each r.f. radiator having predetermined polarization characteristics, controllable phase shifters being interposed in said r.f. feedlines to control the relative phase of r.f. energy associated with each r.f. radiator and thereby to control the beam direction of the overall radiation pattern of said array, said phase shifters being an integral part of said single layer arrangement of electrical conductors, and each of said phase shifters including switchable diodes for controlling the phase shift to be produced thereby.

9. An antenna array comprising:

an electrically conducting ground surface, a single layer electrically conducting surface comprising both a plurality of r.f. radiator conducting areas and a plurality of r.f. feedline conducting areas integrally connected thereto, a dielectric sheet disposed between said ground surface and the single layer electrically conducting surface, each of said r.f. feedlines being connected at the outside edge of its correspondingly associated r.f. radiator conducting area to at least one predetermined point on the periphery of said radiator conducting area to achieve an r.f. radiation pattern having predetermined polarization characteristics from said radiator, said plurality of separate r.f. radiators and respectively corresponding r.f. feedlines being arranged in a phased array including interconnections between said plurality of r.f. feedlines to connect all of the plurality of r.f. radiators with a common r.f. input/output point, and wherein the interconnected r.f. feedlines comprise predetermined different r.f. transmission lengths between the common input/output and the various r.f. radiators to produce a tapered amplitude distribution over the aperture of the array thereby reducing sidelobes in the r.f. radiation pattern of the array.

10. An antenna structure comprising:

an electrically conducting ground surface, a single layer electrically conducting surface comprising both an r.f. radiator conducting area and an r.f. feedline conducting area integrally connecting thereto, a dielectric sheet disposed between said ground surface and the layer electrically conducting surface, and said r.f. feedline being connected at the outside edge of said r.f. radiator conducting area to at least one predetermined point on the periphery of said radiator conducting area to achieve an r.f. radiation pattern having predetermined polarization characteristics from said radiator, said r.f. radiator being formed in a rectangular shaped area, the longer side of the rectangular area being substantially equal to but slightly less than one-half wavelength long at a first anticipated operating frequency when r.f. is to be fed into a shorter side of the area, and the shorter side of the rectangular area being substantially equal to but slightly less than one-half wavelength long at a second anticipated operating frequency when r.f. is to be fed into a longer side of the area.

11. An antenna structure comprising:

an electrically conducting ground surface, a single layer electrically conducting surface comprising both an r.f. radiator conducting area and an r.f. feedline conducting area integrally connected thereto, a dielectric sheet disposed between said ground surface and the single layer electrically conducting surface, said r.f. feedline being connected at the outside edge of said r.f. radiator conducting area to at least one predetermined point on the periphery of said radiator conducting area to achieve an r.f. radiation pattern having predetermined polarization characteristics from said radiator, said r.f. feedline being connected to only one point on the outside edge of said r.f. radiator conducting area to produce an r.f. radiation pattern having circular polarization characteristics, said r.f. radiator conducting area including means dimensioned differently in two mutually orthogonal directions, said means providing two corresponding complex-valued electrical impedances along said directions at the intended r.f. operating frequency, which two complex-valued impedances are complex conjugates of each other thus facilitating the desired circular r.f. polarization characteristic.

12. An antenna structure comprising:

an electrically conducting ground surface, a single layer electrically conducting surface comprising both an r.f. radiator conducting area and an r.f. feedline conducting area integrally connected thereto, a dielectric sheet disposed between said ground surface and the single layer electrically conducting surface, said r.f. feedline being connected at the outside edge of said r.f. radiator conducting area to at least one predetermined point on the periphery of said radiator conducting area to achieve an r.f. radiation pattern having predetermined polarization characteristics from said radiator, said r.f. feedline conducting area comprising:

a first feedline connected only to a first point on the outside edge of said r.f. radiator conducting area to produce a linear r.f. polarization characteristics; and a second feedline connected only to a second point on the outside edge of said r.f. radiator conducting area to produce a circular r.f. polarization characteristic, said r.f. radiator conducting area including means dimensioned differently in two mutually perpendicular directions, said means providing two corresponding complex-valued electrical impedances along said directions at the intended r.f. operating frequency, which two complex-valued impedances are complex conjugates of each other thus facilitating the desired circular r.f. polarization characteristic.

*13. An antenna structure comprising:*

*an electrically conducting ground surface,*

*a single layer electrically conducting surface comprising both an r.f. radiator conducting area and an r.f. feedline conducting area integrally connected thereto,*

*a dielectric sheet disposed between said ground surface and the single layer electrically conducting surface, and*

*said r.f. feedline being connected at the outside edge of said r.f. radiator conducting area to at least one predetermined point on the periphery of said radiator conducting area to achieve an r.f. radiation pattern having predetermined polarization characteristics from said radiator,*

*said r.f. feedline conducting area including:*

*a first section connected to only a first point on the outside edge of said r.f. radiator conducting area,*

*a second section connected to only a second point on the outside edge of said r.f. radiator conducting area,*

*said first and second points being separated by a predetermined amount along the outside edge of said r.f. conducting area to define two intersecting axes of current flow, each such axis passing through a corresponding one of said first and second points, and*

*phase shifting means connected between said first and second sections and a common r.f. input/output point whereby the relative phases of r.f. signals on said first and second sections are controlled with respect to the phase at said common r.f. input/output to produce an r.f. radiation pattern having predetermined polarization characteristics.*

*14. An antenna structure as in claim 13 wherein said phase shifting means comprises means for introducing an approximately 90° relative phase shift thereby producing approximately circular r.f. polarization.*

*15. An antenna structure as in claim 14 wherein said phase shifting means comprises:*

*a closed rectilinear conductive path having four corners, said first and second sections being connected to respectively associated adjacent ones of said corners, and*

*said common r.f. input/output comprising one of the remaining two corners for right-hand circular r.f. polarization and comprising the other one of the remaining two corners for left-hand circular r.f. polarization.*

*16. An antenna structure as in claim 14 wherein:*

*said r.f. radiator conducting area is an approximately square shaped area.*

*17. An antenna structure as in claim 14 wherein:*

*said r.f. radiator conducting area is an approximately circularly shaped area.*

*18. An antenna structure comprising:*

*an electrically conducting ground surface,*

*a single layer electrically conducting surface comprising both an r.f. radiator conducting area and an r.f. feedline conducting area integrally connected thereto,*

*a dielectric sheet disposed between said ground surface and the single layer electrically conducting surface,*

*said r.f. feedline being connected at the outside edge of said r.f. radiator conducting area to only one predetermined point on the periphery of said radiator conducting area to achieve an r.f. radiation pattern having predetermined circular or elliptical polarization characteristics from said radiator,*

*said r.f. radiator conducting area including means dimensioned differently in two mutually orthogonal directions, said means providing two corresponding predetermined complex-valued electrical impedances along said directions at the intended r.f. operating frequency, which two complex-valued impedances are interrelated so as to produce the desired predetermined circular or elliptical r.f. polarization characteristic.*

*19. An antenna structure comprising:*

*an electrically conducting ground surface,*

*a single layer electrically conducting surface comprising both an r.f. radiator conducting area and an r.f. feedline conducting area integrally connected thereto,*

*a dielectric sheet disposed between said ground surface and the single layer electrically conducting surface,*

*said r.f. feedline being connected at the outside edge of said r.f. radiator conducting area to at least one predetermined point on the periphery of said radiator conducting area to achieve an r.f. radiation pattern having predetermined polarization characteristics from said radiator,*

*said r.f. feedline conducting area comprising:*

*a first feedline connected only to a first point on the outside edge of said r.f. radiator conducting area to produce a linear r.f. polarization characteristic; and*

*a second feedline connected only to a second point on the outside edge of said r.f. radiator conducting area to produce an approximately circular r.f. polarization characteristic,*

*said r.f. radiator conducting area including means dimensioned differently in two mutually perpendicular directions, said means providing two corresponding complex-valued electrical impedances along said directions at the intended r.f. operating frequency, which two complex-valued impedances are approximately complex conjugates of each other thus facilitating the desired approximate circular r.f. polarization characteristic.*

* * * * *